United States Patent [19]
Yokoyama et al.

[11] Patent Number: 5,580,684
[45] Date of Patent: Dec. 3, 1996

[54] NON-AQUEOUS ELECTROLYTIC SOLUTIONS AND NON-AQUEOUS ELECTROLYTE CELLS COMPRISING THE SAME

[75] Inventors: Keiichi Yokoyama, Sodegaura; Shigeru Fujita, Tokyo; Akio Hiwara, Sodeguara; Yoshiaki Naruse, Tokyo; Masahiro Toriida, Sodegaura; Atsuo Omaru, Tokyo, all of Japan

[73] Assignees: Mitsui Petrochemical Industries, Ltd.; Sony Corporation, both of Tokyo, Japan

[21] Appl. No.: 499,393

[22] Filed: Jul. 7, 1995

[30] Foreign Application Priority Data

Jul. 7, 1994 [JP] Japan .................................. 6-156137
Sep. 16, 1994 [JP] Japan .................................. 6-221663

[51] Int. Cl.⁶ .................................................. H01M 6/14
[52] U.S. Cl. ....................... 429/194; 429/197; 429/199; 429/203; 429/218; 252/62.2; 252/500
[58] Field of Search ................................ 429/194, 197, 429/199, 203, 218; 252/500, 62.2

[56] References Cited

U.S. PATENT DOCUMENTS

| | | | |
|---|---|---|---|
| 4,774,011 | 9/1988 | Mori et al. ................................. | 252/62.2 |
| 4,858,078 | 8/1989 | Morimoto et al. ........................ | 252/500 |
| 5,350,648 | 9/1994 | Kagawa et al. ........................... | 429/194 |
| 5,455,127 | 10/1995 | Olsen et al. ............................... | 429/199 |
| 5,478,674 | 12/1995 | Miyasaka ................................... | 429/218 |

FOREIGN PATENT DOCUMENTS

| | | |
|---|---|---|
| 0482287 | 4/1992 | European Pat. Off. . |
| 2415883 | 8/1979 | France . |

OTHER PUBLICATIONS

Patent Abstracts of Japan, vol. 9, No. 143 (E–322) (1866) Jun. 18, 1985, Abstract of Japanese Laid–Open Pat. Publ. No. 60–23973 (Feb. 6, 1985).
Chemical Abstracts, vol. 102, No. 22, Abst. No. 188114 (Jun. 3, 1985), Abstract of Japanese Laid–Open Pat. Publ. No. 60–23973 (Feb. 6, 1985).
Pat. Abstracts of Japan, vol. 16, No. 499 (E–1280) Oct. 15, 1992, Abstract of Japanese Laid–Open Pat. Publ. No. 4–184870 (Jul. 1, 1992).
Pat. Abstracts of Japan, vol. 13, No. 344 (E–797) Aug. 3, 1989, Abstract of Japanese Laid–Open Pat. Publ. No. 1–102862 (Apr. 20, 1989).
Database WPI, Derwent Publ. Ltd. AN 91–314646, Abstract of Japanese Laid–Open Pat. Publ. No. 3–210351 (Sep. 13, 1991).
Pat. Abstracts of Japan, vol. 14, No. 151 (E906) Mar. 22, 1990, Abstract of Japanese Laid–Open Pat. Publ. No. 2–10666 (Jan. 16, 1990).

*Primary Examiner*—Bruce F. Bell
*Attorney, Agent, or Firm*—Sherman and Shalloway

[57] ABSTRACT

A non-aqueous electrolytic solutions which has self-distinguishing property, low reactivity to metal lithium and high withstand voltage is provided. The non-aqueous electrolytic solutions of the first invention comprise, as electrolyte, lithium salt preferably $LiPF_6$ and, as solvent, phosphoric acid esters of the following general formula [1];

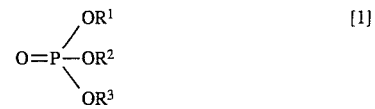

wherein $R^1$, $R^2$ and $R^3$, which may be the same or different, represent an alkyl group or an alkyl group substituted by one or more halogen atoms and at least one of $R^1$, $R^2$, and $R^3$ represents an alkyl group substituted by one or more halogen atoms. The non-aqueous electrolytic solutions of the second invention comprise, as solvents for electrolyte, trimethyl phosphate, one or more linear carbonates represented by the following general formula [3];

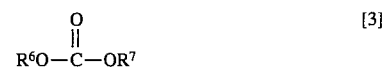

(wherein $R^6$ represents methyl or ethyl group and $R^7$ represents a linear or branched alkyl group having 1 to 3 carbon atoms) and one or more cyclic carbonates and, as electrolyte, $LiPF_6$; wherein content of the trymetyl phosphate is 1 to 10% by volume of the solvents for electrolyte. The non-aqueous electrolytic solution is suitable for a cell using carbon material capable of being doped and dedoped with lithium ions as a negative electrode active material and complexed oxide of lithium and a transition metal as a positive electrode active material.

12 Claims, 2 Drawing Sheets

NON-AQUEOUS ELECTROLYTIC SOLUTIONS AND NON-AQUEOUS ELECTROLYTE CELLS COMPRISING THE SAME

BACKGROUND OF THE INVENTION

The present invention relates to a non-aqueous electrolytic (elecrolyte) solution and a non-aqueous electrolyte cell utilizing the same.

Electric cells utilizing non-aqueous electrolytic solution have been widely used as electric sources of various kinds of consumer electronic appliances because of their high voltage and high energy density as well as their reliability such as storage characteristics. As non-aqueous electrolytic solutions, generally used are those comprising a mixture of solvents of high dielectric constant such as propylene carbonate, γ-butyrolactone and sulfolane and solvents of low viscosity such as dimethoxyethane, tetrahydrofuran and 1,3-dioxolane and an electrolyte such as $LiBF_4$, $LiPF_6$, $LiClO_4$. $LiASF_6$, $LiCF_3SO_3$, $LiN(CF_3SO_2)_2$, $LiAlCl_4$ and $LiSiF_6$.

However, the solvents of such non-aqueous electrolytic solutions generally have a low withstand voltage. When charge/discharge cycles are repeated in secondary cells utilizing an electrolytic solution comprising a solvent with a low withstand voltage, the solvent is decomposed by electrolysis and thereby undesirable situations may be observed; for example, generated gases increase the internal pressure of the cells and the decomposition products are deposited and piled on electrodes. These phenomena reduce charge/discharge efficiency of the cells and reduce energy density of the cells and this ultimately leads a shorter cycle-life of the cells. As attempts to improve the durability of electrolytic solutions, it has been proposed that a carbonate having a high withstand voltage such as diethyl carbonate is used instead of conventional solvents having a low withstand voltage such as esters including γ-butyrolactone and ethyl acetate and ethers including 1,3-dioxolane, tetrahydrofuran and dimethoxyethane to suppress the reduction of energy density of cells after repeated charge/discharge cycles (for example, see Japanese Patent Application Laid-open (KOKAI) No. 2-10666).

Negative electrodes of secondary lithium cells are generally composed of metal lithium or lithium alloys. When charge/discharge cycles are repeated in such cells, lithium ions in electrolytic solutions may be deposited on the negative electrodes in a partial manner to generate very reactive needlelike metals, termed "dendrites". If the dendrites are released from the electrodes, there may be some problematic situations; for example, the cycle-life of the cells is shortened due to the self-consumption of the electrodes and the dendrites penetrate separators, which separate the positive electrode and the negative electrode, to cause short circuit.

Meanwhile, because cells having a high energy density are desired, various researches concerning high voltage cells are being conducted from various points of view. For example, secondary cells termed "rocking chair type" have been developed, which comprises a positive electrode of complexed oxide of lithium and transition metal such as $LiCoO_2$, $LiNiO_2$ and $LiMn_2O_4$ and an negative electrode of carbon materials. Cells of this type are capable of generating cell voltage of 4 V and they are confirmed to be safe in various experiments such as overcharge, external short circuit, needle piercing, crushing and the like because they do not deposit metal lithium. Therefore, they have become widely used for consumer use. However, when much higher energy density and larger scale are contemplated for these cells, further improvements of safety such as enhanced fire resistance would be desired. Currently used electrolytic solutions do not always have a satisfactorily high inflammation point and they do not have self-extinguishing property. Moreover, even in the lithium secondary cells of "rocking chair type" mentioned above, metal lithium may be deposited under severe conditions such as extreme overcharge due to erroneous usage of the cells. Then it is still required to reduce reactivities of an electrolytic solution and metal lithium.

For these requirements, it has been proposed that phosphoric acid esters, known as self-extinguishable compounds, are added to electrolytic solutions (Japanese Patent Application Laid-open (KOKAI) No. 4-184870). And an electrolytic solution using trimethyl phosphate as solvent thereof is proposed (Japanese Patent Application Laid-open (KOKAI) No.1-102862). However, when more than 15% by volume of these compounds described in the above prior art (Japanese Patent Application Laid-open (KOKAI) No. 4-184870) are added to electrolytic solutions, there have been some cases where problems with regard to cell charge/discharge efficiency, cell energy density and cell life-time (cycle-time) occur, though the solutions have acceptable flame resistance.

SUMMARY OF THE INVENTION

The present invention has been completed to solve the above described problems and its object is to provide non-aqueous electrolytic solutions which do not show reductions of charge/discharge efficiency and energy density after charge/discharge cycles and, in addition, are excellent in withstand voltage, ion-conductivity (electro-conductivity), load characteristics and low temperature characteristics. Another object of the present invention is to provide non-aqueous electrolytic solutions which are self-extinguishing and of high inflammation point and low reactivity to metal lithium.

Yet another object of the present invention is to provide non-aqueous electrolyte cells capable of generating high voltage and showing excellent cell characteristics and long lifetime.

The present inventors had diligently conducted researches of phosphoric acid esters (phosphate) showing excellent self-extinguishing property in order to produce non-aqueous electrolytic solutions capable of generating high voltage and excellent in cell characteristics. As a result, at first it was found that, by introducing one or more substituents of halogen atoms such as fluorine into at least one substituent of phosphoric acid esters, their reactivity with metal lithium can be reduced and that non-aqueous electrolytic solutions preserving self-extinguishing property and capable of providing excellent cell characteristics can be obtained by addition of such phosphoric acid esters.

Secondary, it was found that, by limiting the content of the trimethyl phosphate in the electrolytic solution, non-aqueous electrolytic solutions with excellent cell characteristics and low reactivity with metal lithium and even preserving self-extinguishing property can be obtained.

Namely, it was found that, non-aqueous electrolytic solutions containing trimethyl phosphate, one or more linear carbonates (carbonic acid esters) represented by the following general formula [3] and a cyclic carbonate as solvents for electrolyte and $LiPF_6$ as electrolyte and the content of the trimethyl phosphate being 1 to 10% by volume of the solvent had high inflammation point, were not likely to be fired and had self-extinguishing property, excellent withstand voltage and charge/discharge characteristics.

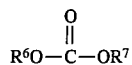  [3]

In the general formula [3], $R^6$ represents methyl or ethyl group and $R^7$ represent a linear or branched alkyl group having 1 to 3 carbon atoms. Further, it was found that cells utilizing the electrolytic solutions described above show improved safety and improved charge/discharge cycle lifetime.

Therefore, according to the present invention (the first invention), there are provided non-aqueous electrolytic solutions comprising one or more phosphoric acid esters of the following general formula [1]:

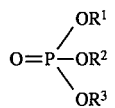  [1]

wherein $R^1$, $R^2$ and $R^3$, which may be the same or different, represent an alkyl group or an alkyl group substituted by one or more halogen atoms and at least one of $R^1$, $R^2$ and $R^3$ represents an alkyl group substituted by one or more halogen atoms.

The non-aqueous electrolyte cell of the present invention utilizes the electrolytic solution containing the phosphoric acid ester of the general formula [1] described above as an electrolytic solution.

The non-aqueous electrolytic solutions of the second invention comprise, as solvents for electrolyte, trimethyl phosphate, one or more linear carbonates represented by the following general formula [3] and one or more cyclic carbonates, wherein the content of the trimethyl phosphate is from 1 to 10% by volume of the solvent.

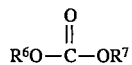  [3]

In the formula, $R^6$ represents methyl or ethyl group and $R^7$ represent a linear or branched alkyl group having 1 to 3 carbon atoms.

DETAILED EXPLANATION OF THE INVENTION

Figure 1:
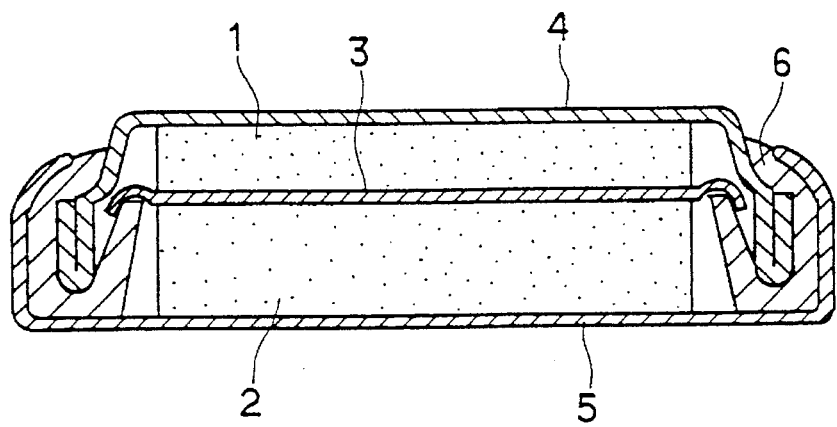
FIG. 1 is a cross-sectional view of an example of the non-aqueous electrolyte cells according to the first invention of the present invention. In the drawing, a reference number 1 represents a negative electrode and a reference number 2 represents a positive electrode.

The present invention will be explained hereinafter.

The first invention is non-aqueous electrolytic solutions comprising one or more phosphoric acid esters of the following general formula [1]:

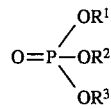  [1]

wherein $R^1$, $R^2$ and $R^3$, which may be the same or different, represent an alkyl group or an alkyl group substituted by one or more halogen atoms and at least one of $R^1$, $R^2$ and $R^3$ represents an alkyl group substituted by one or more halogen atoms.

The phosphoric acid ester compounds of the general formula [1] have self-extinguishing property and, by adding them to electrolytic solutions, the solution can be made self-extinguishable. In addition, because at least one of $R^1$, $R^2$ and $R^3$ is substituted with one or more halogen atoms, reactivity with metal lithium of the electrolytic solution of the present invention is reduced. In the compounds of the general formula [1], at least one of $R^1$, $R^2$ and $R^3$ should be an alkyl group substituted with halogen atom(s) and the rest may be an alkyl group or an alkyl group substituted with halogen atom(s).

Higher phosphorous content in the phosphoric acid esters, i.e., smaller molecular weights of $R^1$, $R^2$ and $R^3$ or larger addition amount of the phosphoric acid esters may bring more enhanced self-extinguishing property of the phosphoric acid esters. And it is not preferred to increase addition amount of phosphoric acid having a larger molecular weight to the electrolytic solution, because such addition increase viscosity of the solution and hence reduce ion-conductivity. Therefore, carbon numbers of $R^1$, $R^2$ and $R^3$ as small as possible are preferred. The alkyl groups of $R^1$, $R^2$ and $R^3$ preferably have 1 to 4 carbon atoms, and the alkyl groups substituted with halogen atom(s) preferably have 2 to 4 carbon atoms.

Examples of the alkyl groups include methyl, ethyl, n-propyl, isopropyl, n-butyl, sec-butyl, t-butyl, iso-butyl groups and the like. Examples of the alkyl groups substituted with halogen atom(s) include alkyl groups substituted with fluorine atom(s), alkyl groups substituted with chlorine atom(s) and alkyl groups substituted with bromine atom(s), and one alkyl group substituted with halogen atoms may have fluorine, chlorine and bromine atoms simultaneously. Specific examples of the alkyl group substituted with fluorine atom(s) include 2,2,2-trifluoroethyl, 2,2-dlfluoroethyl, monofluoroethyl, pentafluoropropyl, 2,2,3,3-tetrafluoropropyl, 1,1,1-trifluoroisopropyl, 1,3-difluoro-2-propyl, hexafluoroisopropyl, 2,2,3,3,4,4,4-heptafluorobutyl, 2,2,3,4,4,4-hexafluorobutyl, hexafluoro-2-methylisopropyl, 3,3,4,4,4-pentafluoro-2-butyl, 4,4,4-trifluorobutyl and perfluoro-t-butyl groups. Those alkyl groups having chlorine atoms or bromine atoms instead of fluorine atoms in the same substitution patterns as mentioned above are also exemplified as the alkyl groups substituted by halogen atoms.

Examples of phosphoric acid esters according to the present invention are, for example, tris(trifluoroethyl) phosphate, methyl bis(trifluoroethyl) phosphate, dimethyl trifluoroethyl phosphate, ethyl bis(trifluoroethyl) phosphate, diethyl trifluoroethyl phosphate, propyl bis(trifluoroethyl) phosphate, dipropyl trifluoroethyl phosphate, tris(pentafluoropropyl) phosphate, methyl bis(pentafluoropropyl) phosphate, dimethyl pentafluoropropyl phosphate, ethyl bis(pentafluoropropyl) phosphate, diethyl pentafluoropropyl phosphate, butyl bis(pentafluoropropyl) phosphate, dibutyl pentafluoropropyl phosphate and those having the alkyl groups substituted with halogen atoms and the alkyl groups mentioned above.

The phosphoric acid esters substituted with halogen atom(s) can make solvents difficult to burn as described above, and their reactivity with metal lithium is greatly suppressed compared with conventional phosphate compounds such as trimethyl phosphate. However, when they are used alone as solvents, they reduce ion-conductivity and hence reduce cell energy density of electrolytic solution. Therefore, according to the present invention, mixed solvents comprising the phosphoric acid esters described above and other solvents are preferably used to obtain electrolytic solutions for secondary cells with properties suitable for practical use. For this purpose, mixed solvents containing the phosphoric acid esters substituted with halogen atom(s) preferably in an amount of 1 to 20% by volume, more preferably 5 to 15% by volume based on the total volume of the solvents may be provided. By using mixed solvents having a composition described above, satisfactory self-extinguishing property of electrolytic solutions can be obtained without influencing on cell characteristics, for example, without reducing ion-conductivity and energy density of cells.

The solvents to be mixed with the above-described phosphoric acid ester compounds substituted with halogen atom(s) may be one or more of conventionally used solvents, for example, linear ethers such as dimethoxyethane, cyclic ethers such as tetrahydrofuran, amides such as dimethylformamide, carbamates such as methyl-N,N-dimethylcarbamate, linear esters such as diethyl carbonate and cyclic esters such as propylene carbonate. In particular, when they are used for high voltage cells, the phosphoric acid esters substituted with halogen atom(s) can be mixed with the linear esters and/or the cyclic esters to increase ion-conductivity of electrolytic solutions and hence improve cell performance.

The linear esters used herein are one of those represented by the following general formula [2] or a mixture of them.

[2]

In the general formula [2], $R^4$ represents methyl, ethyl, propyl, methoxy or ethoxy group and $R^5$ represents a linear or branched alkyl group having 1 to 3 carbon atoms.

By mixing the linear esters of the general formula [2] with the phosphoric acid esters substituted with halogen atom(s), viscosity of the electrolytic solutions can be reduced and electrolytic solutions showing excellent ion-conductivity at room temperature and also at a lower temperature can be obtained. Examples of the linear ester are dimethyl carbonate, methyl ethyl carbonate, diethyl carbonate, methyl propyl carbonate, methyl isopropyl carbonate, methyl butyl carbonate, ethyl butyl carbonate, methyl formate, ethyl formate, propyl formate, methyl butyrate, ethyl butyrate, methyl acetate, ethyl acetate, propyl acetate, methyl propionate and ethyl propionate. When the electrolytic solutions are used for the cells comprising positive electrodes of $LiCoO_2$, $LiMnO_2$, $LiMn_2O_4$, $LiNiO_2$ and the like, which can generate 4 V, dimethyl carbonate, diethyl carbonate and methyl ethyl carbonate are particularly preferred from the viewpoint of anti-oxidation stability.

The linear esters can normally be used at a concentration of 20 to 90% by volume, preferably from 40 to 80% by volume of the solvents contained in the electrolytic solutions.

As the cyclic esters, one or more of propylene carbonate, ethylene carbonate, butylene carbonate, vinylene carbonate, γ-butyrolactone and sulfolane can be used and propylene carbonate and ethylene carbonate are preferred. These cyclic esters can normally be used at a concentration of 10 to 70% by volume, preferably from 20 to 60% by volume of the solvents contained in the electrolytic solutions. By mixing the cyclic esters with the phosphoric acid esters substituted with halogen atom(s), dissociation property of electrolytes can be enhanced and hence ion-conductivity can be increased.

It is further preferred that both of the linear esters and the cyclic esters are mixed with the phosphoric acid esters, because synergistic effect of reduction of viscosity and enhancement of electrolyte dissociation can be obtained. When $V_2O_5$, polyaniline or the like, which can be generate a voltage of around 3 V, is used as positive electrodes of the cells, there can be used, instead of or together with the linear esters and the cyclic esters, materials having a withstand voltage lower than those of the esters, for example, linear ethers such as dimethoxyethane, cyclic ethers such as tetrahydrofuran, amides such as dimethylformamide, carbamates such as methyl-N,N-dimethylcarbamate, carbamates and amides such as N-methyloxazolidone and N-methylpyrrolidone.

Electrolytes contained in the electrolytic solutions of the present invention may be lithium salts such as $LiPF_6$, $LiBF_4$, $LiClO_4$, $LiAsF_6$, $LiCF_3SO_3$, $LiN(CF_3SO_2)_2$, $LiAlCl_4$ and $LiSiF_6$. $LiPF_6$ is particularly preferred. When $LiPF_6$ is used as the electrolyte, excellent self-extinguishing property can be maintained even though the content of the phosphoric acid esters of the present invention is reduced. Therefore, it can be possible to prevent reduction of charge/discharge efficiency and energy density of the cells.

The concentration of the electrolyte in the electrolytic solution may be usually 0.1 to 3 mol/liter, preferably, 0.5 to 2 mol/liter.

The non-aqueous electrolyte cells of the present invention utilize the non-aqueous electrolytic solutions having a composition explained above and comprises at least a negative electrode, positive electrode and separator.

As the negative electrode material, metal lithium, lithium alloys and carbon materials capable of being doped and undoped (dedoped) with lithium ions can be used and carbon materials capable of doped and undoped with lithium ions are particularly preferred. Such carbon materials may be graphite or amorphous carbon, and all kinds of carbon materials such as activated carbon, carbon fibers, carbon black and mesocarbon microbeads can be used.

As the positive electrode material, transition metal oxides such as $MnO_2$ and $V_2O_5$, transition metal sulfides such as $MoS_2$ and $TiS_2$, electro-conductive polymers such as polyaniline and polypyrrole, compounds capable of being reversibly polymerized and depolymerized by electrolysis such as disulfide compounds, complexed oxides of lithium and transition metals such as $LiCoO_2$, $LiMnO_2$, $LiMn_2O_4$ and $LiNiO_2$ and the like can be used, and the complexed oxides of lithium and transition metals are preferred.

Since the non-aqueous electrolyte cells of the present invention comprise the non-aqueous electrolytic solutions explained above as electrolytic solutions, they can be non-aqueous electrolyte secondary cells of practical use, which can generate high voltage, show high charge/discharge efficiency and do not show reduction of energy density even after repeated charge/discharge cycles.

The shape of the non-aqueous electrolyte cells of the present invention is not particularly limited and they may have a shape selected within the scope of the present invention such as cylindrical shape, rectangular shape, coin-like shape, card-like shape, large size shape and the like.

The second invention of the present invention will be explained hereinafter.

The non-aqueous electrolytic solutions of the second invention comprise, as solvents for electrolyte, trimethyl phosphate, one or more linear carbonates represented by the following general formula [3] and one or more cyclic carbonates.

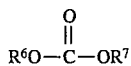
$$R^6O-\overset{\overset{O}{\|}}{C}-OR^7 \qquad [3]$$

In the formula, $R^6$ represents methyl or ethyl group and $R^7$ represent a linear or branched alkyl group having 1 to 3 carbon atoms.

Trimethyl phosphate has a high inflammation point and can elevate inflammation point of solvents mixed therewith. In addition, trimethyl phosphate has fire resistant properties and can impart self-extinguishing property to solvents. However, since trimethyl phosphate also reduces charge/discharge efficiency and energy density of cells, it is important to use it in a suitable amount. In order to impart fire resistant properties to solvents, trimethyl phosphate should be contained in the solvents in an amount of not less than 1% by volume of the solvents. Preferably, it should be contained in amount of not less than 3% by volume. When non-aqueous electrolyte solutions contain trimethyl phosphate in an amount of not less than 3% by volume, they can have satisfactory fire resistant properties. On the other hand, when non-aqueous electrolyte solutions contain more than 10% by volume of trimethyl phosphate, charging efficiency of cells deteriorates. Accordingly, the content of trimethyl phosphate should be not more than 10% by volume, preferably not more than 7% by volume. The content of not more than 7% by volume does not reduce charging efficiency of cells.

In the linear carbonates of the general formula [3], $R^6$ represents methyl or ethyl group and $R^7$ represent a linear or branched alkyl group having 1 to 3 carbon atoms. Examples of such carbonates are, for example, dimethyl carbonate, methyl ethyl carbonate, diethyl carbonate, methyl propyl carbonate, methyl isopropyl carbonate and the like. Among these, dimethyl carbonate, methyl ethyl carbonate and diethyl carbonate are particularly preferred. These carbonates may be used alone or in any combination thereof.

By using the linear carbonates together with trimethyl phosphate, withstand voltage is improved and decomposition of solvents for electrolyte due to oxidation is suppressed. In addition, it may improve solubility of electrolyte and hence may give electrolytic solutions with excellent ion-conductivity either at room temperature or at a low temperature. To obtain electrolytic solutions having such characteristics, the linear carbonates can be mixed with solvents for electrolyte normally in an amount of 20 to 90% by volume, preferably 40 to 75% by volume. When the content of the linear carbonates is less than 20% by volume, the solvents become likely to be oxidized and hence decomposed. When the content is more than 90% by volume, self-extinguishing property is deteriorated. Solvents with desired withstand voltage and self-extinguishing property can be obtained by a content of from 40 to 75% by volume.

As the cyclic esters to be contained in solvents for the non-aqueous electrolytic solutions, while butylene carbonate, vinylene carbonate and the like can be used, propylene carbonate, ethylene carbonate and a mixture thereof are preferred. By adding these carbonates, solubility of electrolyte can be increased even at a low temperature and hence viscosity can be lowered, ion-conductivity can be improved and it is possible to make it easy to transport the electrolyte. The cyclic esters are normally used at a concentration of 10 to 70% by volume, preferably from 20 to 60% by volume of the solvents contained in the electrolytic solutions. This range is preferred since low viscosity and high dielectric constant, i.e., high ion-conductivity can be obtained.

The solvents for electrolyte of the present invention may contain, in addition to trimethyl phosphate, the linear carbonates and the cyclic carbonates described above, other solvents conventionally used as solvents for electrolytic solution of cells, for example, ethers, esters, γ-butyrolactone, sulfolane or the like in an amount which does not deteriorate the characteristics of the solvents for electrolyte of the present invention.

As electrolyte to be dissolved in the solvents for electrolyte, $LiPF_6$ is preferred. By using $LiPF_6$ as electrolyte, excellent self-extinguishing property can be maintained with a low content of trimethyl phosphate. Other electrolytes used for conventional electrolytic solution of cells, for example, $LiBF_4$, $LiClO_4$, $LiAsF_6$, $LiCF_3SO_3$, $LiAlCl_3$, $LiSiF_6$, $LiN(SO_3CF_3)_2$, $LiC_4F_9SO_3$, $LiC_8F_{17}SO_3$ and the like can be used. However, when those lithium salts are used, satisfactory self-extinguishing property cannot be obtained unless the content of trimethyl phosphate is more than 10% by volume of the solvent and, if so, charge/discharge efficiency and energy density of cells are reduced.

The concentration of the electrolyte in the solvent may be usually 0.1 to 3 mol/liter, preferably, 0.5 to 2 mol/liter.

The non-aqueous electrolyte cells of the present invention utilize the non-aqueous electrolytic solutions described above, carbon materials capable of being doped and undoped with lithium ions as negative electrode materials and complexed oxides of lithium and transition metals as positive electrode materials.

According to the present invention, by using trimethyl phosphate, one or more linear carbonates represented by the general formula [3] and a cyclic carbonate as solvents for electrolyte and $LiPF_6$ as electrolyte to be dissolved in the solvent, low reactivity with metal lithium and high inflammation point of non-aqueous electrolytic solutions can be obtained and decomposition of the solvent due to oxidation becomes not likely to occur and hence long chrage/discharge cycle life time of cells can be obtained.

Figure 3:
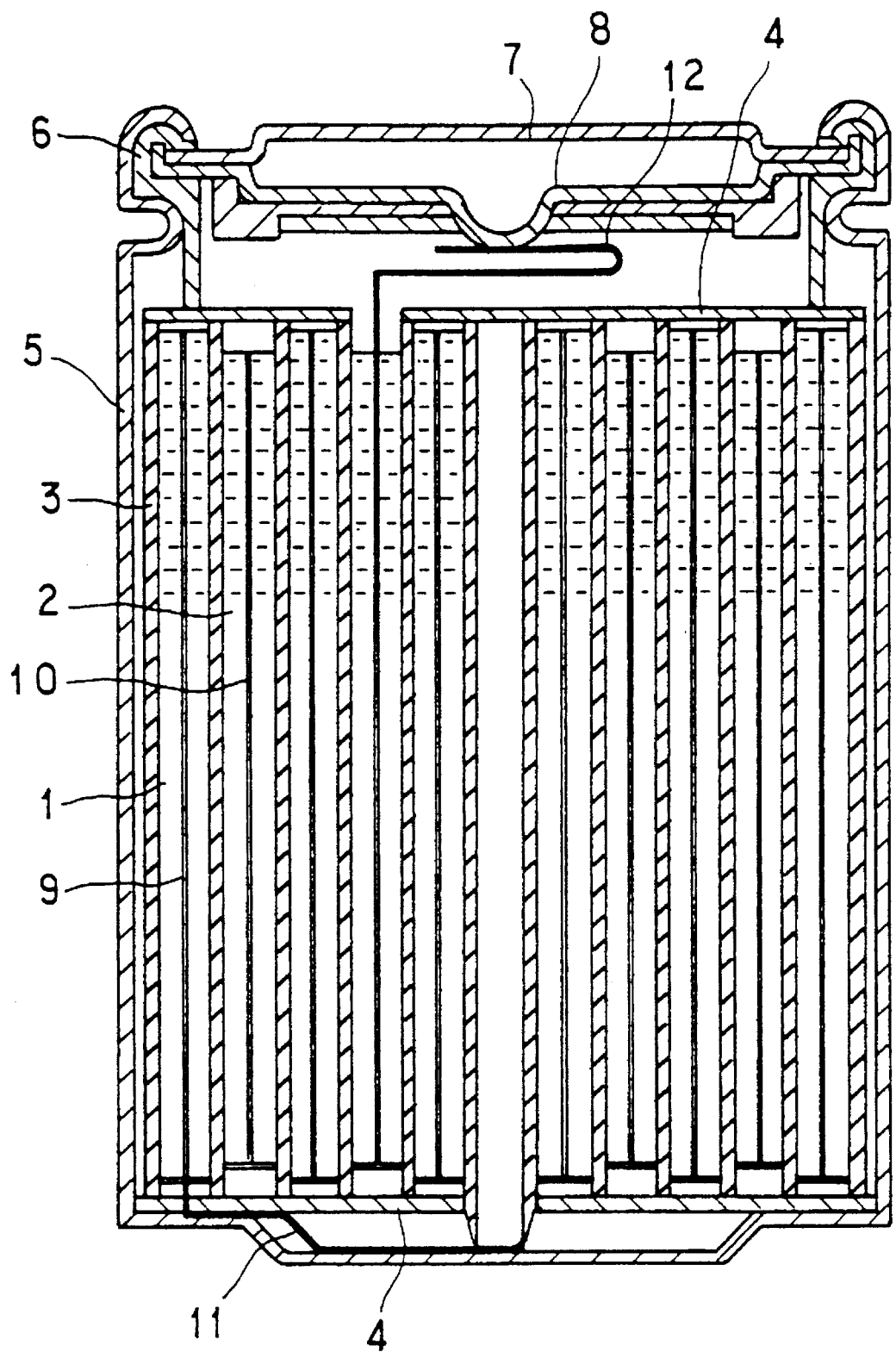
FIG. 3 is a cross-sectional view of another example of the non-aqueous electrolyte secondary cells according to the second invention of the present invention. In the drawing, a reference number 1 represents a negative electrode and a reference number 2 represents a positive electrode.

The non-aqueous electrolyte cells of the second invention of the present invention can be realized, in one embodiment, as a cylindrical non-aqueous electrolyte secondary cell. The cylindrical non-aqueous electrolyte secondary cells comprises, as shown in FIG. 3, a negative electrode i consisting of a negative electrode current collector 9 applied with negative electrode active material and a positive electrode 2 consisting of a positive electrode current collector 10 applied with positive electrode active material, which are rolled up while putting a separator 3 between them and placed in a cell can 5 with insulators 4 at the top and bottom ends thereof. A cell lid 7 is fixed on the cell can 5 by caulking the cell can 5 around the cell lid 7 while putting a sealing gasket 6 between them. They are electrically connected to the negative electrode 1 and the positive electrode 2 via a negative electrode lead 11 and a positive electrode lead 12, respectively, so that they can function as negative and positive electrodes of the cell.

As negative electrode active materials constituting the negative electrode 1, metal lithium, lithium alloys and carbon materials capable of storing and releasing lithium ions can be used and carbon materials capable of doped and undoped (dedoped) with lithium ions are particularly preferred. Such carbon materials may be graphite or amorphous carbon, and all kinds of carbon materials such as activated carbon, carbon fibers, carbon black and mesocarbon microbeads can be used.

As positive electrode active materials constituting the positive electrode 2, transition metal oxides and sulfides such as $MoS_2$, $TiS_2$, $MnO_2$ and $V_2O_5$, complexed oxides of lithium and transition metals such as $LiCoO_2$, $LiMnO_2$, $LiMn_2O_4$ and $LiNiO_2$ and the like can be used, and the complexed oxides of lithium and transition metals are particularly preferred.

The non-aqueous electrolyte cells of the present invention contain the non-aqueous electrolytic solutions explained above and its shape is not limited to that of the embodiment mentioned above and may be selected within the scope of the present invention. For example, it may be cylindrical shape, rectangular shape, coin-like shape, large size shape or the like.

EXAMPLES

The present invention will be illustrated by referring to the following working examples hereinafter, but the present invention is no way limited by these examples.

1. Evaluation of reactivity of phosphoric acid esters with metal lithium

A metal lithium foil piece (2×0.5 cm, thickness; 0.5 mm) was mixed with a phosphoric acid ester compound (10 ml), which had been dehydrated and purified by distillation, in a glass container under an argon atmosphere showing a dew point temperature of −60° C. The lithium foil was shaved in the phosphoric acid ester so that clean surface of the metal was exposed to the phosphoric acid ester. The glass container was heated to various temperatures to examine reaction between the metal lithium and the phosphoric acid ester. As the phosphoric acid ester, used were phosphoric acid esters substituted with halogen atoms, tris(trifluoroethyl) phosphate (hereinafter abbreviated as "TFEPT") and tris(2-chloroethyl) phosphate (hereinafter abbreviated as "TCEPA"). As comparative example, trimethyl phosphate and triethyl phosphate (hereinafter abbreviated as "TEPA") were used.

As a result, triethyl phosphate was reacted with lithium at 165° C. to violently generate bubbles and the lithium was melted by heat of the reaction. And trimethyl phosphate was also reacted with lithium at 180° C. to generate bubbles. On the other hand, in TFEPA, melting of lithium was observed at 180° C., but the melting only formed a gray coating on its surface and the reaction did not further proceed. The melting of metal lithium and formation of a coating on its surface were observed in the mixed solvent comprising propylene carbonate and trimethyl phosphate in a ratio of 9:1 at 180° C. and a littel amount of bubbles generated but further reaction was greatly suppressed.

Examples of the first invention

1. Evaluation of self-extinguishing property of electrolytic solutions

Using a mixed solvent comprising three components, propylene carbonate (abbreviated as "PC" hereinafter), methyl ethyl carbonate (abbreviated as "MEC" hereinafter) and a phosphoric acid ester (TFEPA or TCEPA) in a given ratio as a solvent for electrolytic solution, an electrolytic solution containing dissolved lithium phosphate hexafluoride ($LiPF_6$) as electrolyte in an amount of 1.0 mol/liter was provided. As a comparative example, an electrolytic solution containing the same electrolyte in the same amount as above in a mixed solvent of PC and MEC.

A Manilla paper strip for separator having a width of 1.5 cm, length of 30 cm and thickness of 0.04 mm was immersed into an electrolytic solution contained in a beaker for more than 1 minute. The Manilla paper strip was pulled up and excess sample dropped from the strip was removed by contacting it to wall of the beaker. The Manilla paper strip was then fixed horizontally on a sample rest by piercing the strip with supporting needles provided on the sample rest with 2.5 cm intervals. The Manilla paper strip and the sample rest were introduced into a metal box (25 cm ×25 cm×50 cm) and one end of the strip was fired with a lighter. Length of the Manilla paper strip burned and time required for the strip to burn from the first needle to the last needle (30 cm) were measured three times, respectively. Burned lengths and burning rates calculated from the time required to burn are shown in Table 1

TABLE 1

| Solvent composition (volume ratio) | Burned length (cm) | Burning rate (cm/sec) |
|---|---|---|
| PC/MEC/TFEPA | | |
| 40/55/05 | 25 | 0.8 |
| 40/53/07 | 20 | 0.7 |
| 40/50/10 | 2 | 0.5 |
| 40/40/20 | ~0 | ~0 |
| PC/MEC/TCEPA | | |
| 40/55/05 | 20 | 0.7 |
| 40/53/07 | 5 | 0.5 |
| 40/50/10 | ~0 | ~0 |
| 40/40/20 | ~0 | ~0 |
| PC/MEC | | |
| 40/60 | 30 | 0.8 |

In Table 1, "0" means that the strip was not burned.

Burned lengths of separator paper strips (Manilla paper) were further measured in the same manner as above by using a mixed solvent comprising PC, MEC and TFEPA in a volume ratio of 40/50/10 as a solvent for electrolyte and various electrolytes at an electrolyte concentration of 1.0 mol/liter. Results are shown in Table 2.

TABLE 2

| Electrolyte(*) | Burned length (cm) | Note |
|---|---|---|
| $LiBF_4$ | 20 | |
| $LiPF_6$ | 2 | |
| $LiClO_4$ | 30 | Violently burned |
| $LiCF_3SO_3$ | 30 | |
| No electrolyte | 30 | |

*Solvent; PC/MEC/TFEPA = 40/50/10
Electrolyte concentration; 1.0 mol/l

As clearly seen from Table 2, particularly excellent self-extinguishing property was obtained when LiPF6 was used as the electrolyte.

2. Measurement of withstand voltage and ion-conductivity of electrolytic solutions 25 ml of electrolytic solution (electrolyte concentration: 1.0 mol/liter) was prepared by dissolving 3.8 g (25 mmol) of $LiPF_6$ as an electrolyte in a mixed solvent having one of the compositions of PC, MEC and TFEPA indicated in Table 3. Withstand voltage and ion-conductivity of the electrolytic solution were measured. ion-conductivity was measured by an impedance meter at 10 kHz. Measurement of withstand voltage of electrolytic solution was carried out as follows: The electrolytic solution described above was charged in a three-electrode cell for withstand voltage measurement, which had a glassy carbon work electrode, platinum counter electrode and metal lithium reference electrode, and voltage scanning was performed at 10 mV/sec by means of a potentiogalvanostat. The voltage range where oxidation degradation current of more than 0.1 mA based on the potential of the metal lithium did not flow was considered as the withstand voltage. The results are shown in Table 3.

TABLE 3

| Solvent composition (volume ratio) PC/MEC/TFEPA | Withstand voltage (V) | Ion-conductivity (ms/cm) 25° C. |
| --- | --- | --- |
| 40/55/05 | — | 7.9 |
| 40/53/07 | — | 7.5 |
| 40/50/10 | — | 7.2 |
| 40/40/20 | — | 5.8 |
| 50/00/50 | 7.2(*) | 3.1 |
| 40/60/00 | 6.4 | 8.9 |

*Oxidation voltage began to flow at 6.4 V.

As clearly seen from Table 3, the electrolytic solutions of the present invention showed high withstand voltage and ion-conductivity of practical level.

3. Evaluation of cell charge/discharge efficiency and cycle characteristics

A non-aqueous electrolyte cell of coin-like shape such as shown in FIG. 1 having a diameter of 20 mm and a height of 2.5 mm was manufactured. The cell had a negative electrode 1 of metal lithium and a positive electrode 2 formed by pressure-molding a mixture comprising 85 parts by weight of $LiCoO_2$, 12 parts by weight of graphite as a conductive agent and 3 parts by weight of fluoro resin as a binder. The materials of the negative electrode 1 and positive electrode 2 were bonded to the negative electrode can 4 and positive electrode can 5 respectively via a porous separator 3 of polypropylene. An electrolyte formed by dissolving lithium phosphate hexafluoride at a concentration of 1.0 mol/l in a mixed solvent comprising PC, MEC and TFEPA in a volume ratio of 45:45:10 was introduced into the cell and the cell was sealed with a sealing gasket 6.

Thus manufactured cell (Example 1) was charged with a current of 1.0 mA and a maximum voltage of 4.2 V for 10 hours and then discharged with a current of 1.0 mA so that the cell showed a voltage of 3.0 V to determine the charge/discharge efficiency of the cell. Further, this charge/discharge cycle was repeated given times to examine the change of the charge/discharge efficiency of the cell. The results are shown in FIG. 2, where the charge/discharge efficiency is plotted to the number of cycles.

Further, charge/discharge efficiency was determined in the same manner as above with respect to coin-like shape cells manufactured in the same manner as described above using a mixed solvent of PC, MEC and TCEPA (volume ratio=45:45:10) as Example 2 or a mixed solvent of PC, MEC and TEPA (volume ratio=45:45:10) as Comparative Example.

Figure 2:
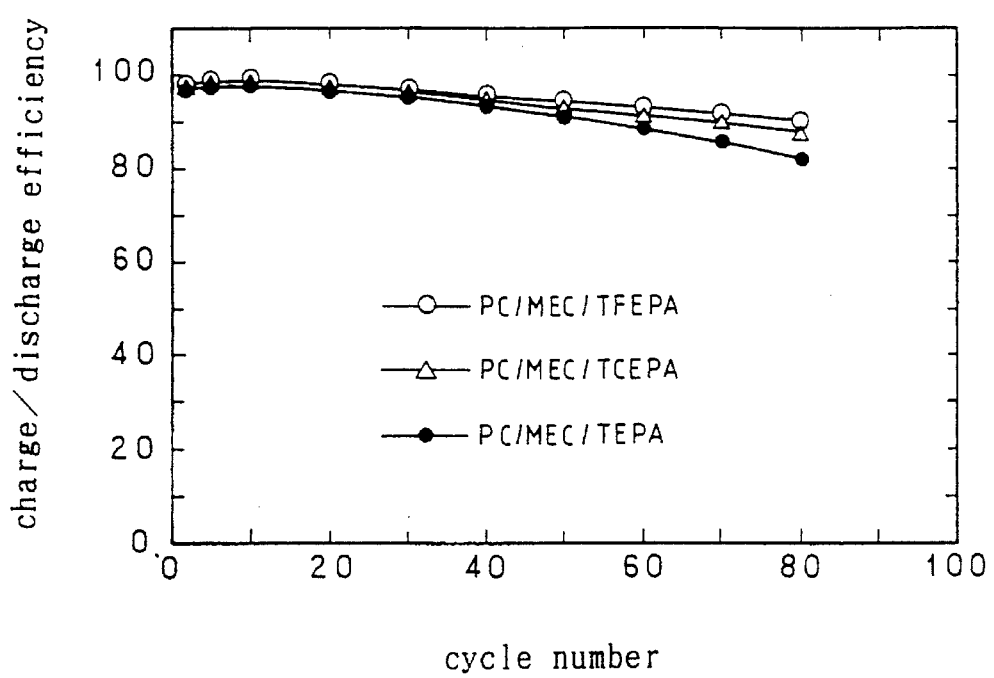
FIG. 2 is a graph showing the charge/discharge cycle characteristics of the cells utilizing the non-aqueous electrolytic solutions according to the first invention of the present invention.

As clearly seen from FIG. 2, the cells utilizing the electrolyte solvent of the present invention showed excellent cycle characteristics.

As seen from the above-described working examples, according to the present invention (the first invention), by using organic solvents comprising the specific phosphoric acid esters substituted with halogen atom(s) as solvents for electrolytic solution, there can be provided non-aqueous electrolytic solutions with low reactivity with metal lithium, self-extinguishing property and ion-conductivity of practical level. In particular, by using mixed solvents of the specific phosphoric acid esters substituted with halogen atoms and the specific ester compounds as solvents for electrolytic solutions, there can be obtained electrolytic solutions with low viscosity and excellent low temperature characteristics. Further, according to the present invention, by utilizing the non-aqueous electrolytic solutions, there can be provided non-aqueous electrolyte secondary cells capable of generating high voltage and showing excellent cell characteristics such as charge/discharge characteristics.

Examples of the second invention

1. Measurement of self-extinguishing property of the electrolytic solutions

A Manilla paper sheet for separator having a thickness of 0.04 mm was cut into a strip having a width of 1.5 cm and length of 32 cm and this strip was immersed into an electrolytic solution contained in a beaker for more than 1 minute. The electrolytic solution had been prepared as described in the working examples hereinafter. The Manilla paper strip was pulled up and excess sample dropped from the strip was removed by contacting it to wall of the beaker. The Manilla paper strip was then fixed horizontally on a sample rest by piercing the strip with supporting needles provided on the sample rest with 25 mm intervals. The Manilla paper strip fixed on the sample rest were introduced into a metal box (250 mm×250 mm×500 mm) and one end of the strip was fired with a lighter. Length of the Manilla paper strip burned was measured three times. Average values of three burned lengths are shown in the following tables.

1) Self-extinguishing property of the electrolytic solutions of a various composition of the solvents The test was carried out by using samples of electrolytic solutions containing propylene carbonate (PC), methyl ethyl carbonate (MEC) and trimethyl phosphate (TMPA) in various mixing ratios. An electrolyte, LiPF6, was dissolved at a concentration of 1.0 mol/liter. Results shown in Table 4 were obtained.

As comparative examples, those containing triethyl phosphate (TEPA) or no trimethyl phosphate were tested in a similar manner. Results are also shown in Table 4.

TABLE 4

| Solvent composition | Volume ratio | Burned length (cm) |
| --- | --- | --- |
| PC/MEC/TMPA | 40/57/03 | 4 |
|  | 40/55/05 | 3 |
|  | 40/53/07 | 2 |
|  | 40/50/10 | 1 |
| PC/MEC/TEPA | 40/55/05 | 30 |
|  | 40/53/07 | 15 |
|  | 40/50/10 | 7 |
| PC/MEC | 40/60 | 30 |

As seen from Table 4, it was found that those containing trimethyl phosphate have self-extinguishing property.

2) Self-extinguishing property of the electrolytic solutions of a various kind of electrolytes Test was carried out by using electrolytic solutions comprising various kind of electrolytes dissolved in a mixed solvent having a composition of propylene carbonate/methyl ethyl carbonate/trimethyl phosphate=40/55/5 (volume ratio) at a concentration of 1.0 mol/liter (mol/l). Results shown in Table 5 were obtained.

TABLE 5

| Electrolyte | Burned length (cm) |
| --- | --- |
| $LiPF_6$ | 3 |
| $LiBF_4$ | 14 |
| $LiClO_4$ | 30 |
|  | (Violently burned) |
| $LiCF_3SO_3$ | 30 |
| No electrolyte | 30 |

As clearly seen from Table 5, it was found that an electrolytic solution containing $LiPF_6$ as the electrolyte has particularly excellent self-extinguishing property.

3) Self-extinguishing property of the electrolytic solutions with different concentration of $LiPF_6$ Test was carried out by using electrolytic solutions comprising electrolyte dissolved in a mixed solvent having a composition of propylene carbonate/methyl ethyl carbonate/trimethyl phosphate=40/55/5 (volume ratio). Results shown in Table 6 were obtained.

TABLE 6

| Concentration of $LiPF_6$ (mol/liter) | Burned length (cm) |
|---|---|
| 0.8 | 5 |
| 1.0 | <1 |
| 1.2 | <1 |

As clearly seen from Table 6, it was found that a small content of $LiPF_6$ could show self-extinguishing property.

4) Self-extinguishing property of the electrolytic solutions comprising a various kind of the linear carbonates Test was carried out by using electrolytic solutions comprising $LiPF_6$ dissolved in a mixed solvent having a composition of propylene carbonate/a linear carbonate/trimethyl phosphate=40/55/5 (volume ratio) at a concentration of 1.0 mol/liter. As the linear carbonate, used were dimethyl carbonate (DMC), methyl ethyl carbonate (MEC) and diethyl carbonate (DEC). Results shown in Table 7 were obtained.

TABLE 7

| Linear carbonate | Burned length (cm) |
|---|---|
| DMC | <1 |
| MEC | 3 |
| DEC | 14 |

As clearly seen from Table 7, it was found that electrolytic solutions containing the linear carbonates have excellent self-extinguishing property.

2. Measurement of withstand voltage and ion-conductivity of electrolytic solutions An electrolytic solution containing 1.0 mol/liter of $LiPF_6$ was prepared. ion-conductivity of the electrolytic solution was measured by an impedance meter at 10 kHz. The measurement was conducted at room temperature (25° C.) and a low temperature (−20° C.). Withstand voltage of the electrolytic solution was measured as follows: The electrolytic solution described above was charged in a three-electrode cell for withstand voltage measurement, which had a glassy carbon work electrode and counter electrode and metal lithium reference electrode, and voltage scanning was performed at 50 mV/sec by means of the potentiostat. The voltage range where decomposition current of more than 0.1 mA did not flow was considered as the withstand voltage.

1) Withstand voltage and ion-conductivity of the electrolytic solutions of a various composition The test was carried out by using samples of the electrolytic solution containing propylene carbonate (PC), methyl ethyl carbonate (MEG) and trimethyl phosphate (TMPA) in various mixing ratios. Results shown in Table 8 were obtained.

As a comparative example, one containing no trimethyl phosphate was tested in a similar manner. Result is also shown in Table 8.

TABLE 8

| Solvent composition (volume ratio) PC/MEC/TMPA | Withstand voltage (V) | Ion-conductivity (ms/cm) | |
|---|---|---|---|
| | | 25° C. | −20° C. |
| 40/57/03 | 6.8 | 8.7 | 2.5 |
| 40/55/05 | 6.7 | 8.8 | 2.5 |
| 40/53/07 | 6.6 | 8.8 | 2.5 |
| 40/50/10 | 6.5 | 8.7 | 2.5 |
| 40/60/0 | 6.4 | 8.9 | 2.5 |

As clearly seen from Table 8, it was found that electrolytic solutions of the present invention show high withstand voltage and excellent ion-conductivity suitable for practical use either at room temperature or low temperature.

2) Withstand voltage and ion-conductivity of the electrolytic solutions of a various concentration of $LiPF_6$ Test was carried out by using electrolytic solutions comprising $LiPF_6$ dissolved in a mixed solvent having a composition of PC/MEC/TMPA=40/55/5 (volume ratio). Results are shown in Table 9.

TABLE 9

| $LiPF_6$ concentration (mol/liter) | Withstand voltage (V) | Electro-conductivity (ms/cm) | |
|---|---|---|---|
| | | 25° C. | −20° C. |
| 0.8 | 6.5 | 8.7 | 2.9 |
| 1.0 | 6.7 | 8.8 | 2.5 |
| 1.2 | 6.7 | 8.5 | 2.3 |

As clearly seen from Table 9, it was found that a small content of $LiPF_6$ can provide high withstand voltage and excellent ion-conductivity suitable for practical use either at room temperature or low temperature.

3. Cell discharge capacity and cycle characteristics

A negative electrode 1 was prepared as follows.

As a negative electrode active material, used was a non-graphitizable carbon material having properties similar to glassy carbon, which was obtained by sintering a starting material of petroleum pitch under an inert gas flow at 1000° C. X-ray diffraction analysis of this material showed that it has a distance between the (002) faces of 3.76 Å and it has an absolute specific gravity of 1.58 g/cm$^3$. The obtained carbon was ground and made into a carbon powder material having an average particle size of 10 μm. Ninety (90) parts by weight of the carbon powder material was mixed with 10 parts by weight of a binder, polyvinylidene fluoride (PVDF), to form a negative electrode formulation. This was then dispersed in N-methyl-2-pyrrolidone to give a slurry. The slurry was uniformly applied to both surfaces of a negative electrode current collector 9 which was composed of a copper foil tape having a thickness of 10 μm, then dried and compression molded by a roll pressmachine to give the negative electrode 1.

A positive electrode 2 was prepared as follows.

A positive electrode active material ($LiCoO_2$) was obtained by mixing lithium carbonate and cobalt carbonate in a molar ratio of 0.5:1 and sintering them in air at 900° C. for 5 hours.

Ninety one (91) parts by weight of the obtained $LiCoO_2$ was mixed with 6 parts by weight of a conductive agent, graphite, and 3 parts by weight of a binder, polyvinylidene fluoride (PVDF), to form a positive electrode formulation.

This was then dispersed in N-methyl-2-pyrrolidone to give a slurry. The slurry was uniformly applied to both surfaces of a positive electrode current collector 10 which was composed of an aluminium foil tape having a thickness of 20 μm, then dried and compression molded by a roll press machine to give the positive electrode 2.

The positive electrode tape 2, the negative electrode tape 1 and a separator tape 3 consisting of a microporous polypropylene film having a thickness of 25 μm were laminated and the obtained laminate was rolled up to form a roll.

The roll was inserted and put into a steel cell can 5, which had been plated with nickel and contained an insulator 4 in its bottom. One end of a nickel negative electrode lead 11 was contact-bonded to the negative electrode 1 and the other end was welded to the cell can 5 for negative electrode current collection. Further, for positive electrode current collenction, one end of an aluminium positive electrode lead 12 was bonded to the positive electrode 2 and the other end was electrically connected to a cell lid 7 via a thin plate for current breaking 8, which breaks electric current depending on internal pressure of the cell.

Then, an electrolytic solution which contains trimethyl phosphate in an amount indicated in Table 10 in terms of volume % and dissolved $LiPF_6$ at a concentration of 1 mol/liter in a mixed solvent comprising 50% by volume of propylene carbonate (PC) and 50% by volume of methyl ethyl carbonate (MEC) was poured into the cell can 5. The cell lid 7 was fixed by caulking the cell can 5 around the lid while putting an insulating sealing gasket 6 applied with asphalt between the lid 7 and the cell can 5 to manufacture a cylindrical non-aqueous electrolyte cell with a diameter of 18 mm and a height of 65 mm (Examples 3 and 4).

As comparative examples, cylindrical non-aqueous electrolyte cells were manufactured in a similar manner by using electrolytic solutions containing triethyl phosphate in an amount indicated in Table 10 in terms of volume % instead of trimethyl phosphate or containing no trimethyl phosphate (Comparative Examples 1 to 5).

To evaluate capacity and cycle characteristics of the obtained cells, the following test was conducted.

Charging was carried out at a constant current of I A and a constant voltage of 4.2 V for 2.5 hours and discharging was carried out at a constant current of 1000 mA with a final voltage of 2.75 V. This charge/discharge cycle was repeated 100 cycles and discharge capacity at the second cycle was measured with respect to each of the exemplary cells. Results are shown in table 10. Further, capacity preservation ratio (%) at the 100th cycle was calculated considering the discharge capacity of the first cycle as 100%. Results are also shown in table 10.

TABLE 10

| | Additive | Added amount (volume %) | Discharge capacity ratio (mAh) (2nd cycle) | Capacity preservation ratio (%) (100th cycle) |
|---|---|---|---|---|
| Example | | | | |
| 3 | TMPA | 5 | 1041 | 94.2 |
| 4 | TMPA | 10 | 1029 | 92.7 |
| Comparative Example | | | | |
| 1 | TEPA | 5 | 1040 | 94.4 |

TABLE 10-continued

| | Additive | Added amount (volume %) | Discharge capacity ratio (mAh) (2nd cycle) | Capacity preservation ratio (%) (100th cycle) |
|---|---|---|---|---|
| 2 | TEPA | 10 | 1026 | 92.5 |
| 3 | TMPA | 15 | 990 | 88.6 |
| 4 | TEPA | 15 | 988 | 88.8 |
| 5 | — | — | 1050 | 95.8 |

As clearly seen from Table 10. it was found that the cells using not more than 10% by volume of trimethyl phosphate have slightly lower discharging capacity and slightly inferior cycle characteristics compared with the cells containing no trimethyl phosphate. However, deterioration extent of cell performance of the cell using not more than 10% by volume of trimethyl phosphate is not so intense, while that of the cells using 15% by volume of trimethyl phosphate was significant. Further, the cell using not more than 10% by volume of trimethyl phosphate showed higher discharging capacity and higher capacity preservation ratio compared with those of the cells using the same amount of triethyl phosphate.

As seen from the above-described working examples, according to the present invention (the second invention), by using novel linear carbonate esters, trimethyl phosphate and cyclic carbonate esters as solvents for electrolytic solutions and $LiPF_6$ as electrolyte, non-aqueous electrolytic solutions showing high inflammation point, excellent self-extinguishing property as well as excellent electroconductivity and withstand voltage were obtained. In addition, according to the present invention (the second invention), cells showing excellent charge/discharge characteristics and cycle characteristics and high energy density can be obtained by using the above-described non-aqueous electrolytic solutions in secondary cells.

What is claimed is:

1. A non-aqueous electrolytic solution comprising a lithium salt as an electrolyte, wherein a solvent for electrolyte contains one or more phosphoric acid esters of the following general formula [1]

wherein $R^1$, $R^2$ and $R^3$, which may be the same or different, represent an alkyl group or an alkyl group substituted with one or more halogen atoms and at least one of $R^1$, $R^2$ and $R^3$ represents an alkyl group substituted by one or more halogen atoms.

2. The non-aqueous electrolytic solution of claim 1 wherein, in the general formula [1], the alkyl group substituted with halogen atoms is an alkyl group substituted with one or more fluorine atoms.

3. The non-aqueous electrolytic solution of claim 1 wherein, in the general formula [1], the alkyl group substituted with one or more halogen atoms contains 2 to 4 carbon atoms.

4. The non-aqueous electrolytic solution of claim 1 which contains, as a solvent for electrolyte, one or more linear ester compounds represented by the general formula [2], $$R^4-\overset{\overset{O}{\|}}{C}-OR^5 \qquad [2]$$

wherein $R^4$ represents methyl, ethyl, propyl, methoxy or ethoxy group and $R^5$ represents a linear or branched alkyl group having 1 to 3 carbon atoms or one or more cyclic ester compounds or both.

5. The non-aqueous electrolytic solution of claim 1 wherein content of the phosphoric acid ester is 1 to 20% by volume based on a total volume of the solvent for electrolyte.

6. The non-aqueous electrolytic solution of claim 1 which contains $LiPF_6$ as the electrolyte.

7. The non-aqueous electrolytic solution of claim 1 wherein content of the electrolyte is in a range of 0.1 to 3.0 mol/liter.

8. A non-aqueous electrolyte cell which contains a non-aqueous electrolytic solution of claim 1.

9. The non-aqueous electrolyte cell of claim 8 which comprises a negative electrode comprising a negative electrode active material selected from the group consisting of metal lithium, lithium alloys and carbon materials doped and undoped with lithium ions and a positive electrode comprising a positive electrode active material containing complexed oxide of lithium and a transition metal.

10. A non-aqueous electrolytic solution comprising;
 a mixture of solvents for an electrolyte of trimethyl phosphate, one or more linear carbonates represented by the following general formula [3], $$R^6O-\overset{\overset{O}{\|}}{C}-OR^7 \qquad [3]$$

wherein $R^6$ represents methyl or ethyl group and $R^7$ represents a linear or branched alkyl group having 1 to 3 carbon atoms and one or more cyclic carbonates; and an electrolyte salt of $LiPF_6$;
 wherein content of the trimethyl phosphate is 1 to 10% by volume of the solvents for the electrolyte.

11. The non-aqueous electrolytic solution of claim 10 wherein the cyclic ester is composed of one or both of propylene carbonate and ethylene carbonate.

12. A non-aqueous electrolyte cell comprising a negative electrode comprising a negative electrode active material of carbon materials doped and undoped with lithium ions, a positive electrode comprising a positive electrode active material of complexed oxide of lithium and a transition metal and a non-aqueous electrolytic solution of claim 10.

\* \* \* \* \*